United States Patent
Burger (10) Patent No.: US 10,770,954 B2
(45) Date of Patent: Sep. 8, 2020

(54) INTERFERENCE SUPPRESSION APPARATUS, ELECTRONIC SUBASSEMBLY, AND USE OF AN INTERFERENCE SUPPRESSION APPARATUS

(71) Applicant: Robert Bosch GmbH, Stuttgart (DE)

(72) Inventor: Dennis Burger, Frolzheim (DE)

(73) Assignee: Robert Bosch GmbH, Stuttgart (GA)

( * ) Notice: Subject to any disclaimer, the term of this patent is extended or adjusted under 35 U.S.C. 154(b) by 225 days.

(21) Appl. No.: 16/065,041

(22) PCT Filed: Nov. 28, 2016

(86) PCT No.: PCT/EP2016/079024
§ 371 (c)(1),
(2) Date: Jun. 21, 2018

(87) PCT Pub. No.: WO2017/108341
PCT Pub. Date: Jun. 29, 2017

(65) Prior Publication Data
US 2019/0068029 A1    Feb. 28, 2019

(30) Foreign Application Priority Data
Dec. 21, 2015  (DE) .................. 10 2015 226 177

(51) Int. Cl.
*H02K 11/02* (2016.01)
*H02K 11/22* (2016.01)
(Continued)

(52) U.S. Cl.
CPC .......... *H02K 11/022* (2013.01); *H02K 7/006* (2013.01); *H02K 11/33* (2016.01); *H02K 11/40* (2016.01);
(Continued)

(58) Field of Classification Search
CPC ...... H02K 11/022; H02K 11/33; H02K 11/40; H02K 7/006; H02M 1/44; H02M 1/126;
(Continued)

(56) References Cited

U.S. PATENT DOCUMENTS 5,103,147 A * 4/1992 Samann ............. B60H 1/00428
318/139
6,018,537 A * 1/2000 Hofmann ................. G01J 9/00
372/102
(Continued)

FOREIGN PATENT DOCUMENTS

CN    203589934 U    5/2014
DE    19804369 A1    8/1999
(Continued)

OTHER PUBLICATIONS

International Search Report with English translation and Written Opinion for Application No. PCT/EP2016/079024 dated Feb. 28, 2017 (15 pages).

*Primary Examiner* — Emily P Pham
(74) *Attorney, Agent, or Firm* — Michael Best & Friedrich LLP (57) ABSTRACT

The invention relates to an interference suppression apparatus (100) for an electronic component, having a positive high-voltage pole (108) and a negative high-voltage pole (109), having at least one capacitance module (101; 101', 101") with in each case at least one first capacitor (103), via which the positive high-voltage pole (108) is connected to earth, and at least one second capacitor (104), via which the negative high-voltage pole (109) is connected to earth, and at least one third capacitor (107) which is connected between the positive high-voltage pole (108) and the negative high-voltage pole (109); and/or at least one inductance module (102) with in each case at least one common-mode inductor (112) which is wound around the positive high-
(Continued)

voltage pole (108) and the negative high-voltage pole (109); wherein the capacitance modules (101; 101', 101") and/or inductance modules (102) are connected in series.

17 Claims, 6 Drawing Sheets

(51) Int. Cl.
| | |
|---|---|
| *H02M 7/00* | (2006.01) |
| *H02K 11/33* | (2016.01) |
| *H02K 11/40* | (2016.01) |
| *H02K 7/00* | (2006.01) |
| *H02M 1/44* | (2007.01) |
| *H02M 1/12* | (2006.01) |

(52) U.S. Cl.
CPC ............. *H02M 1/44* (2013.01); *H02M 7/003* (2013.01); *H02M 1/126* (2013.01)

(58) Field of Classification Search
CPC .......... H02M 7/003; H02M 1/12; H02M 1/14; H02M 3/158; H02M 1/00
See application file for complete search history.

(56) References Cited

U.S. PATENT DOCUMENTS

| | | | | |
|---|---|---|---|---|
| 8,274,806 | B1* | 9/2012 | Potter | H02M 7/10 |
| | | | | 363/65 |
| 2003/0090856 | A1* | 5/2003 | Dingenotto | H01R 13/7197 |
| | | | | 361/311 |
| 2011/0149467 | A1* | 6/2011 | Azuma | B60L 50/16 |
| | | | | 361/306.2 |
| 2012/0275201 | A1* | 11/2012 | Koyama | H02M 7/48 |
| | | | | 363/40 |
| 2013/0181520 | A1* | 7/2013 | Tsuji | H02J 4/00 |
| | | | | 307/31 |
| 2013/0308352 | A1 | 11/2013 | Wu et al. | |
| 2014/0321090 | A1* | 10/2014 | Guerin | H01G 9/26 |
| | | | | 361/782 |
| 2015/0049517 | A1* | 2/2015 | Yan | H02M 3/33569 |
| | | | | 363/17 |
| 2017/0194929 | A1* | 7/2017 | Kochetov | B60L 1/00 |

FOREIGN PATENT DOCUMENTS

| | | |
|---|---|---|
| DE | 112012002638 T5 | 5/2014 |
| EP | 2892139 A1 | 7/2015 |
| EP | 2906030 A1 | 8/2015 |
| EP | 2940701 A2 | 11/2015 |
| FR | 3002094 A1 | 8/2014 |

* cited by examiner

INTERFERENCE SUPPRESSION APPARATUS, ELECTRONIC SUBASSEMBLY, AND USE OF AN INTERFERENCE SUPPRESSION APPARATUS

BACKGROUND OF THE INVENTION

The present invention relates to an interference suppression apparatus for an electronic subassembly, an electronic subassembly, and a use of an interference suppression apparatus for an electric motor of a vehicle.

Electronic components, clocked inverters (pulse inverters) in particular, generate electrical common mode or differential mode disturbances when operating. In order to satisfy statutory EMC requirements, it is therefore necessary to suppress or to screen current-carrying cables.

An interference suppression apparatus for electronic components to be screened in this way is known, for example, from EP 2 906 030 A1.

Often, only the entire electronic apparatus is subject to the statutory EMC (electromagnetic compatibility) requirements, but not its individual electronic components. This is the case, for example, for vehicles with electric or hybrid electric drive. The radiation from the vehicle as a whole can, however, be different, depending on the integration of the electric drive system in electric or hybrid electric vehicles. Individual EMC requirements that depend on the construction of the vehicle are therefore placed on electronic components such as inverter components.

SUMMARY OF THE INVENTION

According to a first aspect, the invention provides an interference suppression apparatus for an electronic subassembly having a positive high-voltage pole and a negative high-voltage pole, having at least one capacitance module, with in each case at least one first capacitor via which the positive high-voltage pole is connected to ground, at least one second capacitor via which the negative high-voltage pole is connected to ground, and at least one third capacitor which is connected between the positive high-voltage pole and the negative high-voltage pole; and/or at least one inductance module having in each case at least one common-mode choke wound around the positive high-voltage pole and the negative high-voltage pole; wherein the capacitance modules and/or inductance modules are connected in series.

The invention accordingly provides an interference suppression apparatus for an electronic subassembly having a positive high-voltage pole and a negative high-voltage pole, having at least one capacitance module. Each capacitance module comprises at least one first capacitor via which the positive high-voltage pole is connected to ground, at least one second capacitor via which the negative high-voltage pole is connected to ground, and at least one third capacitor which is connected between the positive high-voltage pole and the negative high-voltage pole. The interference suppression apparatus further comprises at least one inductance module having in each case at least one common-mode choke wound around the positive high-voltage pole and the negative high-voltage pole, wherein the capacitance modules and/or the inductance modules are connected in series. High-voltage poles refer here in particular to current-carrying cables or busbars between which a high voltage is present. High voltage indicates, for example, a voltage between 200 and 800 V, possibly for electric subassemblies for hybrid/electric vehicles.

According to a further aspect the invention provides an electronic subassembly.

The present invention accordingly provides an electronic subassembly having a positive high-voltage pole and a negative high-voltage pole and at least one interference suppression apparatus.

According to a further aspect the invention provides a use of an interference suppression apparatus for an electric motor of a vehicle.

The present invention accordingly provides a use of an interference suppression apparatus for an electric drivetrain for a vehicle with an inverter, in particular a pulse inverter, and an electric motor, wherein the positive high-voltage pole and the negative high-voltage pole are connected to an inverter of the electric motor.

The interference suppression apparatus according to the invention has the advantage that an easy scalability is available for EMC suppression. Depending on the emission requirements, a specifically chosen number of capacitance modules or inductance modules can be combined together. Thus in the presence of a low-level radiation characteristic, for example in the case of well-screened cables laid appropriately for EMC, or of high-voltage poles, it is possible to use only a small number of capacitance modules and inductance modules. In the presence of a medium-strength or strong radiation characteristic, in particular when cable screens with low screening damping are used, or when power cables are laid inappropriately for EMC, or also when poorly screened cables are used, perhaps between the battery and inverter, a larger number of capacitance modules and inductance modules can be installed. As a result of the scalability, the interference suppression apparatus can be adjusted precisely for the EMC requirements, without failing to satisfy or over-satisfying the EMC requirements.

The invention thereby provides a very economical interference suppression apparatus that can be adapted easily to individual requirements and available installation spaces. Through the use of individual capacitance or inductance modules, these can be installed in a space-saving manner. The development costs and component costs are thereby significantly lower than would be the case for an interference filter development adapted specifically for the individual case.

According to a preferred development of the interference suppression apparatus, the common-mode choke of the at least one inductance module is additionally wound around a magnetic core arranged between the positive high-voltage pole and the negative high-voltage pole. Through the use of such a magnetic separator, the leakage inductance of the common-mode choke is reduced.

According to a preferred development of the interference suppression apparatus, the at least one capacitance module comprises a capacitance module housing for electromagnetic screening, which houses or screens the at least one first capacitor, the at least one second capacitor and the at least one third capacitor. Through the use of a capacitance module housing for electromagnetic screening, the EMC compatibility of the interference suppression apparatus can be increased. Partial regions of particularly strong electromagnetic exposure can thus in particular be efficiently screened.

According to a preferred development of the interference suppression apparatus, the positive high-voltage pole and the negative high-voltage pole are arranged outside the capacitance module housing, while an electrically insulating and thermally conductive layer is formed on the face of the positive high-voltage pole and of the negative high-voltage pole facing away from the capacitance module housing. The interference suppression apparatus thereby offers the possibility of a targeted cooling of individual subassemblies. The capacitors, in particular, of the capacitance module typically must not be operated above temperatures of about 110° C. An additional heat dispersal path is ensured through the thermally conductive layer, whereby the positive or negative high-voltage pole is cooled. The heat is thereby output to the capacitance module or the inductance module to a reduced extent. The operating temperature of the capacitors or common-mode chokes can thereby be reduced, and a reliable operation of the interference suppression apparatus is ensured.

According to a preferred development of the interference suppression apparatus, the at least one first capacitor of the at least one capacitance module is connected to ground via a first damping resistor, while the at least one second capacitor of the at least one capacitance module is connected to ground via a second damping resistor.

According to a preferred development of the interference suppression apparatus, contacts of the at least one first capacitor and/or of the at least one second capacitor and/or of the at least one third capacitor of the at least one capacitance module are connected to the positive high-voltage pole and/or the negative high-voltage pole by screwing and/or clamping and/or plugging in and/or welding.

According to a preferred development of the interference suppression apparatus, the at least one inductance module comprises an inductance module housing for electromagnetic screening, which houses or screens the at least one common-mode choke.

According to a preferred development of the interference suppression apparatus, the inductance module housings and/or capacitance module housings can be connected to one another by screwing and/or clamping and/or plugging in and/or welding. The modules can thereby very easily be combined together and installed.

According to a preferred development of the interference suppression apparatus, the electronic subassembly comprises a housing, wherein the positive high-voltage pole is connected to ground via the at least one first capacitor of the at least one capacitance module via a contact with the housing, and wherein the negative high-voltage pole is connected to ground via the at least one second capacitor of the at least one capacitance module via a contact with the housing.

BRIEF DESCRIPTION OF THE DRAWINGS

Here.

Elements and apparatuses that are identical or have the same function are—unless otherwise stated—given the same reference signs in all the figures. Unless otherwise stated, different forms of embodiment can, furthermore, be combined with one another in any desired way.

DETAILED DESCRIPTION

Figure 1:
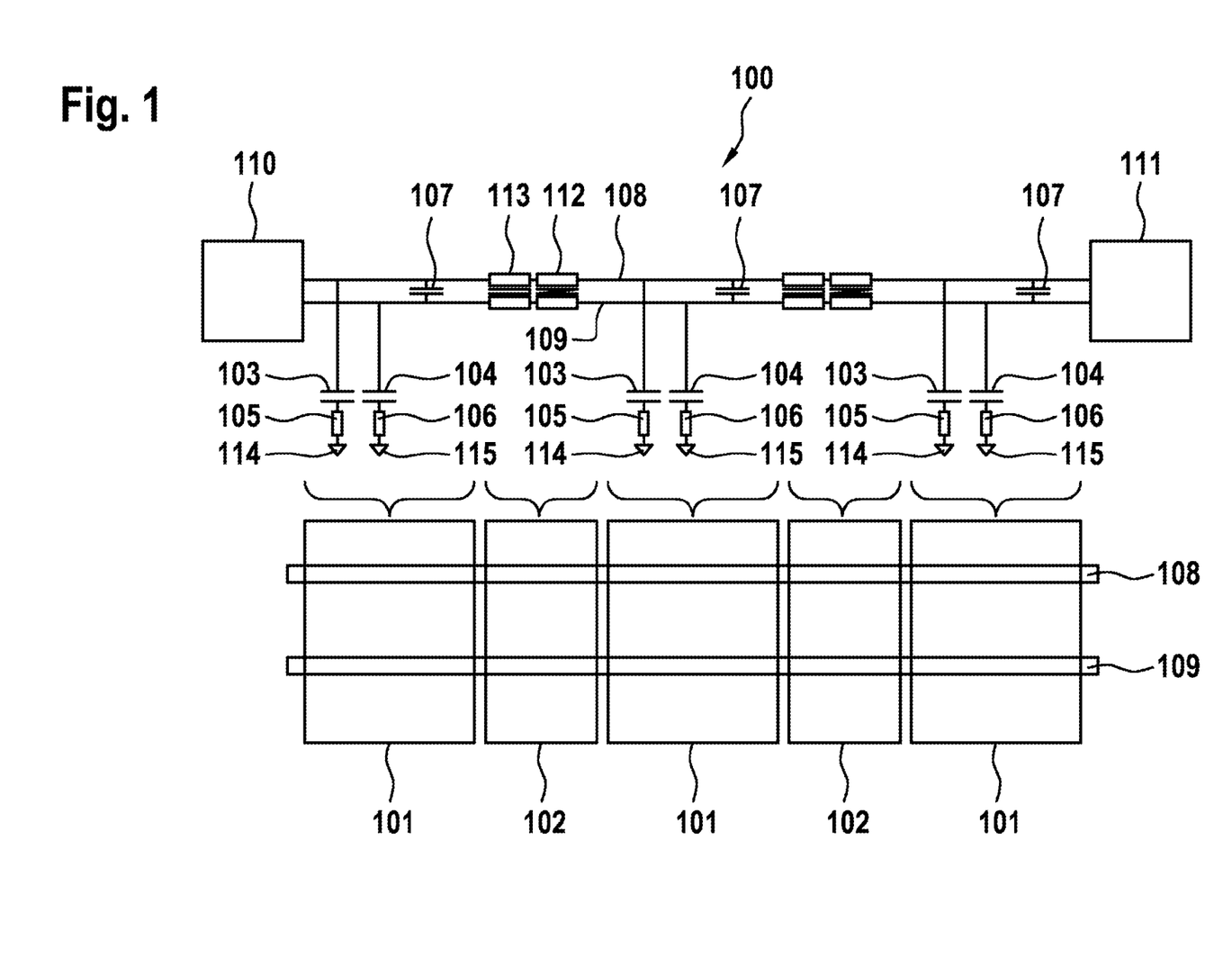
FIG. 1 shows a schematic block diagram of an electronic subassembly with an interference suppression apparatus according to one form of embodiment of the present invention.

FIG. 1 shows a schematic block diagram of an electronic subassembly with an interference suppression apparatus 100 according to one form of embodiment of the present invention. In the electronic subassembly, two conductor rails which form a positive high-voltage pole 108 and a negative high-voltage pole 109 extend between an electrical source 110, in particular a pulse inverter, and an electrical load 111, in particular an electric motor or hybrid motor for a vehicle.

The interference suppression apparatus 100 comprises three capacitance modules 101 and two inductance modules 102. The capacitance and inductance modules 101 and 102 respectively are here connected in series with one another, wherein the sequence of the modules alternates.

Each capacitance module 101 here comprises a first capacitor 103 via which the positive high-voltage pole 108 is connected to ground via a contact 114. Each capacitance module 101 further comprises a second capacitor 104 via which the negative high-voltage pole 109 is connected to ground via a second contact 115. The first capacitor 103 and the second capacitor 104 are here connected to ground via a first damping resistor 105 and a second damping resistor 106 respectively. A third capacitor 107 is further connected between the positive high-voltage pole 108 and the negative high-voltage pole 109. The first to third capacitors 103, 104, 107 can, in particular, be film capacitors or ceramic capacitors.

Figure 2:
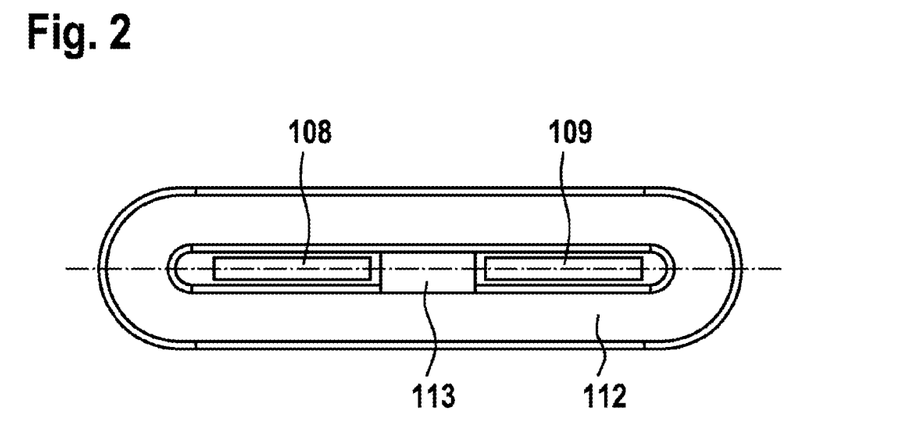
FIG. 2 shows a cross-sectional view of a common-mode choke.

Each inductance module 102 comprises at least one common-mode choke 112. A cross-sectional view of the common-mode choke 112 is represented in FIG. 2. The common-mode choke 112 here consists of an electrically conductive material which is wound with a number of turns 1 around the positive high-voltage pole 108 and the negative high-voltage pole 109. Preferably a magnetic core 113 or bridge, around which the common-mode choke 112 is also wound, is further formed between the positive high-voltage pole 108 and the negative high-voltage pole 109.

The first and second capacitors 103, 104 hereby serve to reduce common mode disturbances and also, in particular at higher frequencies, differential mode disturbances of the positive or negative high-voltage pole 108 or 109 respectively. The third capacitor 107 serves to reduce differential mode disturbances of the positive or negative high-voltage pole 108 or 109 respectively. The inductance module 102 serves to reduce common mode disturbances of the positive or negative high-voltage pole 108 or 109 respectively. The inductance module 102 is also constructed to reduce differential mode disturbances through the magnetic core 113.

Figure 3:
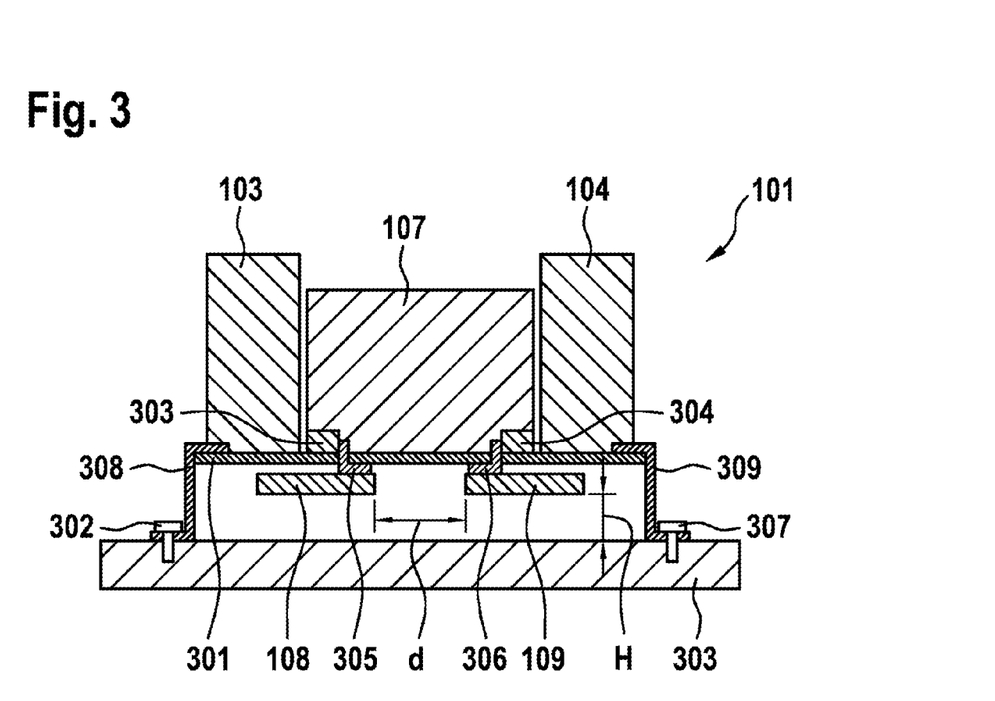
FIG. 3 shows a cross-sectional view of a capacitance module according to one form of embodiment of the invention.

FIG. 3 shows a schematic cross-sectional view of a capacitance module 101 according to a first form of embodiment of the invention. The capacitance module 101 here comprises a circuit board 301 to which the first capacitor 103 and the second capacitor 104 as well as the third capacitor 107 arranged between the first and second capacitors 103 and 104 are fastened. A housing 303 of the electronic subassembly is situated on a face of the circuit board 301 facing away from the first to third capacitors 103, 104, 107. The positive high-voltage pole 108 and the negative high-voltage pole 109 run parallel to one another spaced d apart at a distance H from the housing 303 between the circuit board 301 and the housing 303. The circuit board 301 of the capacitance module 101 is connected, in particular through screwing and/or clamping and/or plugging in and/or welding, to the positive high-voltage pole 108 and the negative high-voltage pole 109 via an electrically conductive first connecting element 305 and an electrically conductive second connecting element 306 respectively. The positive high-voltage pole 108 is connected to ground via the first connecting element 305, a first damping resistor 303, the first capacitor 103, a first metal connecting tab 308 and a first metal screw 302 via the housing 303. The negative high-voltage pole 109 is connected to ground via the second connecting element 306, a second damping resistor 304, the second capacitor 104, a second metal connecting tab 309 and a second metal screw 307 via the housing 303. The positive high-voltage pole 108 and the negative high-voltage pole 109 are further connected to one another via the first connecting element, the third capacitor 107 and the second connecting element 306.

Figure 4:
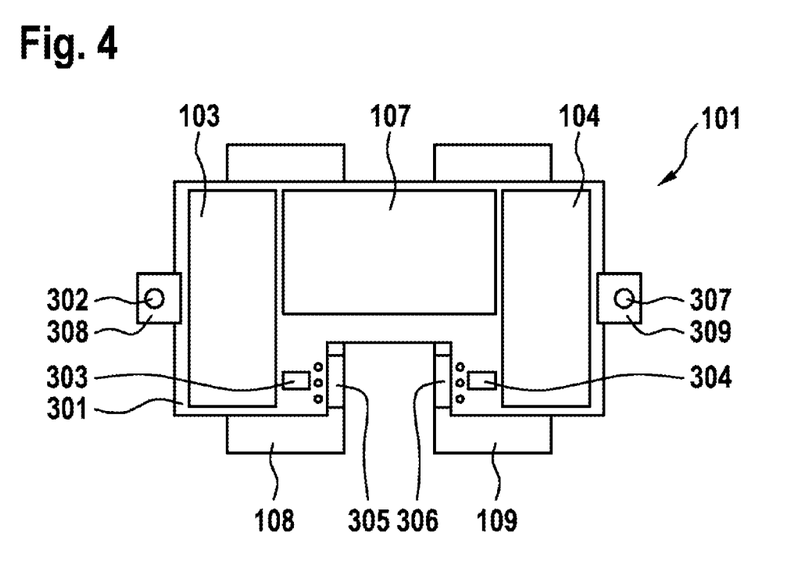
FIG. 4 shows a plan view of a capacitance module according to one form of embodiment of the invention.

FIG. 4 shows a plan view of the capacitance module 101 according to the first form of embodiment. Preferably the capacitance module 101 comprises only four electrical interfaces, one terminal in each case for connecting to the positive and negative high-voltage poles 108, 109, and one connection in each case through which the first and second capacitors 103 and 104 respectively can be connected to ground. In the form of embodiment shown in FIGS. 3 and 4, the four electrical interfaces correspond to the first and second connecting elements 305, 306 respectively and to the first and second screw 302, 307 respectively.

Figure 5:
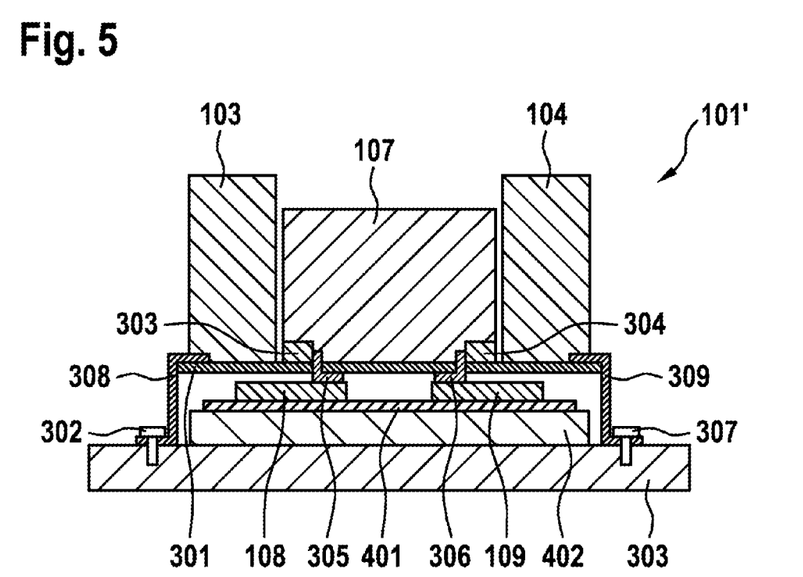
FIGS. 5 and 6 show cross-sectional views of capacitance modules according to further forms of embodiment.

FIG. 5 shows a capacitance module 101' according to a second form of embodiment of the present invention. The housing 303 here comprises an enlargement 402 underneath the positive high-voltage pole 108 and the negative high-voltage pole 109, wherein a coating 401 of an electrically insulating and thermally conductive material is arranged between the enlargement 402 and the positive and negative high-voltage poles 108, 109 respectively, said coating being designed to disperse heat given out by the positive and negative high-voltage poles 108, 109 respectively via the enlargement 402 of the housing 303.

Figure 6:
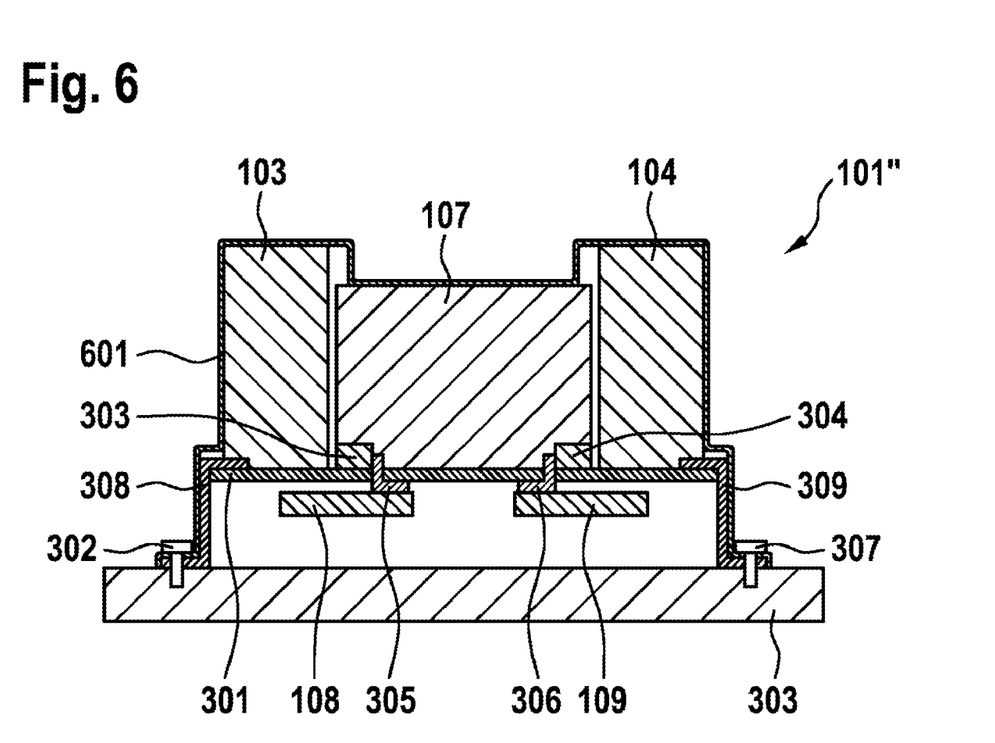

FIG. 6 shows a cross-sectional view of a capacitance module 101" according to a third form of embodiment of the present invention. The capacitance module 101" further comprises a capacitance module housing 601 which houses the first, second and third capacitors 103, 104, 107, and is fastened by means of the first or second screw 302, 307 to the housing 303. The capacitance module housing 601 is designed in particular here for electromagnetic screening of the capacitance module 101".

Preferably the inductance modules 102 comprise inductance module housings which are designed for electromagnetic screening of the corresponding inductance module 102.

Preferably the inductance module housings and capacitance module housings 601 can be plugged into one another or screwed to one another through suitable terminals.

A dimensioning of the capacitance module and inductance module is preferably adapted to dimensions, in particular a height and width, of the positive and negative high-voltage poles 108 and 109 respectively.

Figure 7A:
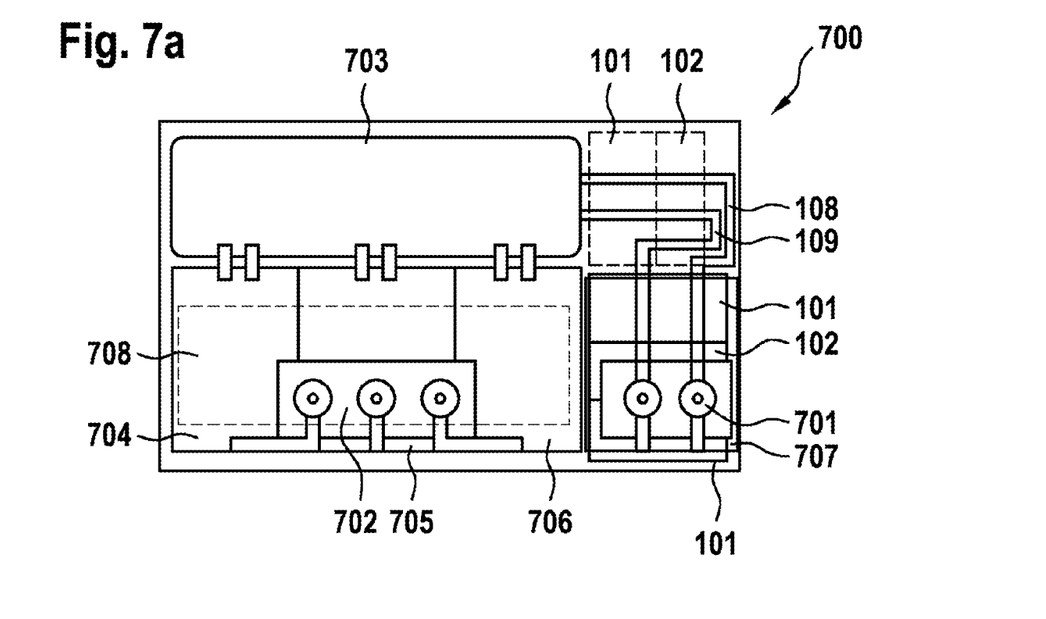
FIGS. 7a, 7b, 8a and 8b show cross-sectional views or plan views of electronic subassemblies according to forms of embodiment of the present invention.
Figure 7B:
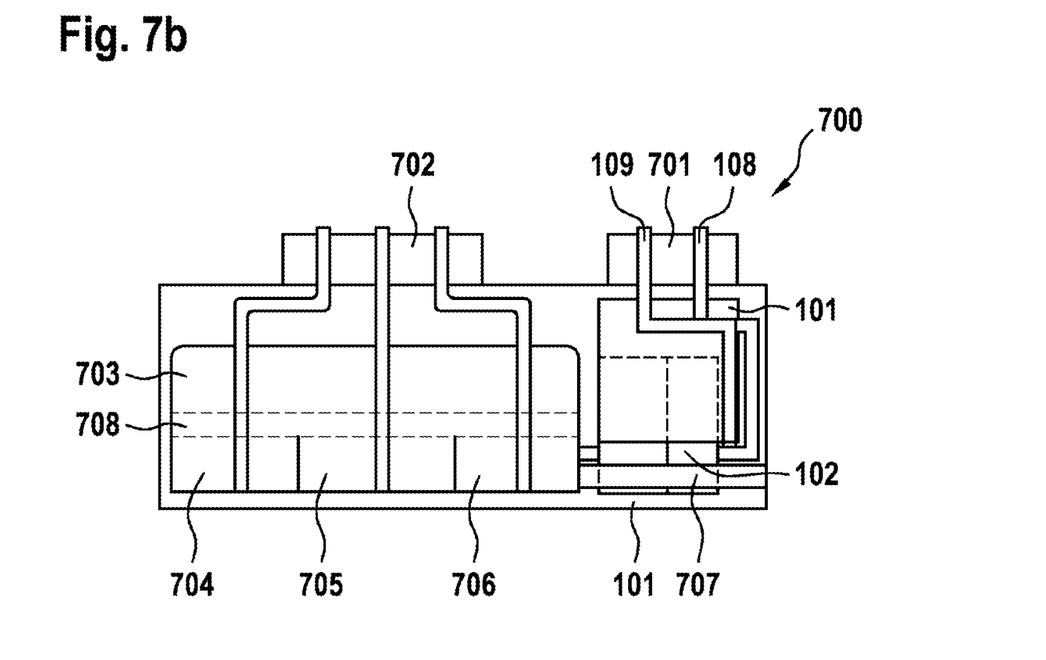

An electronic subassembly 700, designed in particular for a hybrid electric motor or an electric motor of a motor vehicle, is illustrated in FIG. 7a, which shows a plan view and FIG. 7b shows a side view. A first positive high-voltage pole 108 and a second positive high-voltage pole 109, which are designed as busbars, run from a first high-voltage plug 701 to a frequency converter 703 and then via three phase terminals 704, 705 and 706 to a second high-voltage plug 702. The electronic subassembly 700 further comprises a gate driver 708. The first and second high-voltage plugs 702, 701 respectively are here located on an upper face of the electronic subassembly 700. Capacitance modules 101 and inductance modules 102, together with a circuit board 707, are here arranged at the positive high-voltage pole 108 and the negative high-voltage pole 109.

Figure 8A:
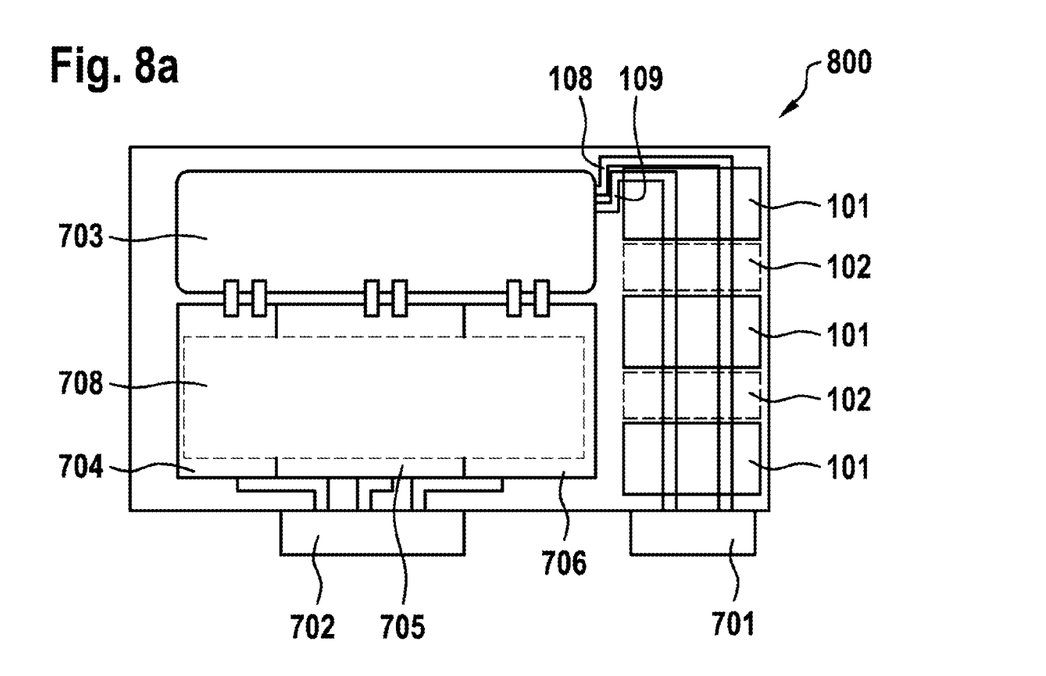
Figure 8B:
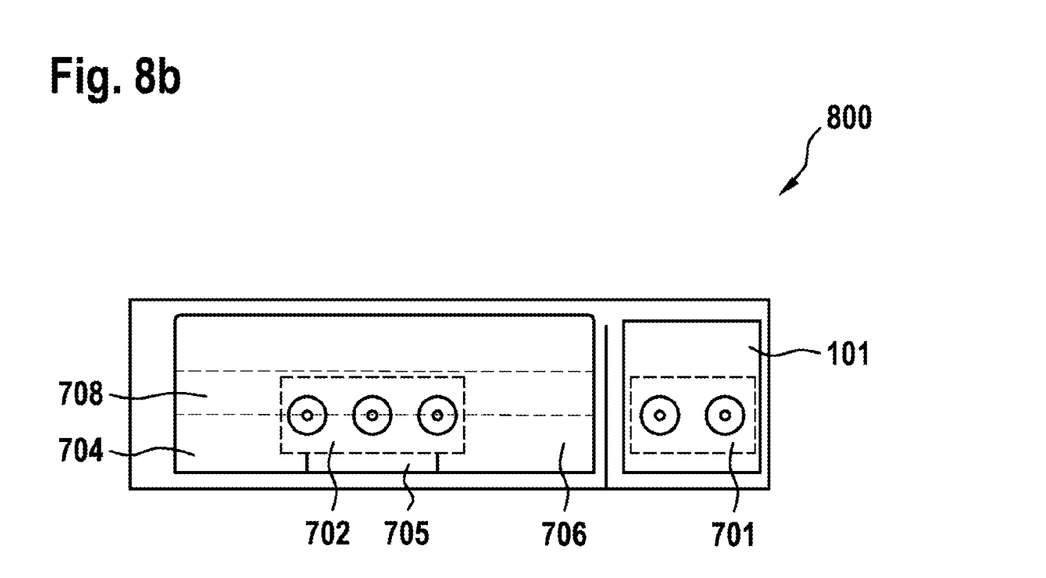

An electronic subassembly 800 according to a further form of embodiment of the present invention is represented in FIG. 8a being a plan view and FIG. 8b being a side view. In contrast to the electronic subassembly 700 illustrated in FIG. 7, the first plug 702 or second plug 701 respectively are here arranged on a side face of the electronic subassembly 800.

Any desired number of capacitance modules 101 or inductance modules 102 can be arranged, as required.

The interference suppression apparatus 100 can be used in particular for an electrical drivetrain of a vehicle with an inverter, in particular a pulse inverter 110, and an electric motor 111, wherein the positive high-voltage pole 108 and the negative high-voltage pole 109 are connected to the inverter 110, in particular by the first high-voltage plug 701 of the electronic subassemblies illustrated in FIGS. 7 and 8.

The interconnection of the capacitance modules and inductance modules is not restricted to the forms of embodiment mentioned. Any desired number of capacitance modules or inductance modules can be used, and any desired sequence of interconnection. Series interconnections C-L-L-C-L-L-C, C-C-L-C-C-L-C-C or C-L-C-L-C-L-C-L can, for example, be used, where C stands for a capacitance module and L stands for an inductance module, and the sequence of the series interconnection is given. Neither the length nor the combination is restricted hereby.

What is claimed is:

1. An interference suppression apparatus (100) for an electronic subassembly having a positive high-voltage pole (108) and a negative high-voltage pole (109), the interference suppression apparatus comprising
   at least one capacitance module (101; 101', 101"), with in each case
      at least one first capacitor (103) via which the positive high-voltage pole (108) is connected to ground,
      at least one second capacitor (104) via which the negative high-voltage pole (109) is connected to ground, and
      at least one third capacitor (107) which is connected between the positive high-voltage pole (108) and the negative high-voltage pole (109); and
   at least one inductance module (102) having in each case
      at least one common-mode choke (112) wound around the positive high-voltage pole (108) and the negative high-voltage pole (109);
   wherein the at least one capacitance module (101; 101', 101") comprises a capacitance module housing (601) for electromagnetic screening,
   wherein the capacitance module housing (601) houses the at least one first capacitor (103), the at least one second capacitor (104) and the at least one third capacitor (107);
   wherein the positive high-voltage pole (108) and the negative high-voltage pole (109) are arranged outside the capacitance module housing (601); and
   wherein an electrically insulating and thermally conductive layer (401) is formed on a face of the positive high-voltage pole (108) and of the negative high-voltage pole (109) facing away from the capacitance module housing (601).

2. The interference suppression apparatus (100) as claimed in claim 1, wherein the common-mode choke (112) of the at least one inductance module (102) is additionally wound around a magnetic core (113) arranged between the positive high-voltage pole (108) and the negative high-voltage pole (109).

3. A vehicle comprising the interference suppression apparatus as claimed in claim 1, and an electric drivetrain with an inverter (110) and an electric motor (111), wherein the positive high-voltage pole (108) and the negative high-voltage pole (109) are connected to the inverter (110).

4. The interference suppression apparatus (100) as claimed in claim 1, wherein the at least one capacitance module (101; 101', 101") and the at least one inductance module (102) are connected in series.

5. The interference suppression apparatus (100) as claimed in claim 1, wherein the at least one first capacitor (103) of the at least one capacitance module (101; 101', 101") is connected to ground via a first damping resistor (105), and wherein the at least one second capacitor (104) of the at least one capacitance module (101; 101', 101") is connected to ground via a second damping resistor (106).

6. The interference suppression apparatus (100) as claimed in claim 1, wherein contacts (305, 306) of the at least one first capacitor (103) and/or of the at least one second capacitor (104) and/or of the at least one third capacitor (107) of the at least one capacitance module (101; 101', 101") are connected to the positive high-voltage pole (108) and/or the negative high-voltage pole (109) by screwing and/or clamping and/or plugging in and/or welding.

7. The interference suppression apparatus (100) as claimed in claim 1, wherein the at least one inductance module (102) comprises an inductance module housing for electromagnetic screening, which houses the at least one common-mode choke (112).

8. The interference suppression apparatus (100) as claimed in claim 7, wherein the inductance module housings and/or capacitance module housings (601) can be connected to one another by screwing and/or clamping and/or plugging in and/or welding.

9. The interference suppression apparatus (100) as claimed in claim 1, wherein the at least one capacitance module (101; 101', 101") and an additional capacitance module (101; 101', 101") are connected in series.

10. The interference suppression apparatus (100) as claimed in claim 1, the at least one inductance module (102) and an additional inductance module (102) are connected in series.

11. An interference suppression apparatus (100) for an electronic subassembly having a positive high-voltage pole (108) and a negative high-voltage pole (109), the interference suppression apparatus comprising
at least one capacitance module (101; 101', 101"), with in each case
at least one first capacitor (103) via which the positive high-voltage pole (108) is connected to ground,
at least one second capacitor (104) via which the negative high-voltage pole (109) is connected to ground, and
at least one third capacitor (107) which is connected between the positive high-voltage pole (108) and the negative high-voltage pole (109);
wherein the at least one capacitance module (101; 101', 101") comprises a capacitance module housing (601) for electromagnetic screening,
wherein the capacitance module housing (601) houses the at least one first capacitor (103), the at least one second capacitor (104) and the at least one third capacitor (107),
wherein the positive high-voltage pole (108) and the negative high-voltage pole (109) are arranged outside the capacitance module housing (601); and
wherein an electrically insulating and thermally conductive layer (401) is formed on a face of the positive high-voltage pole (108) and of the negative high-voltage pole (109) facing away from the capacitance module housing (601).

12. The interference suppression apparatus (100) as claimed in claim 11, wherein the at least one first capacitor (103) of the at least one capacitance module (101; 101', 101") is connected to ground via a first damping resistor (105), and wherein the at least one second capacitor (104) of the at least one capacitance module (101; 101', 101") is connected to ground via a second damping resistor (106).

13. The interference suppression apparatus (100) as claimed in claim 11, wherein contacts (305, 306) of the at least one first capacitor (103) and/or of the at least one second capacitor (104) and/or of the at least one third capacitor (107) of the at least one capacitance module (101; 101', 101") are connected to the positive high-voltage pole (108) and/or the negative high-voltage pole (109) by screwing and/or clamping and/or plugging in and/or welding.

14. An interference suppression apparatus (100) for an electronic subassembly having a positive high-voltage pole (108) and a negative high-voltage pole (109), the interference suppression apparatus comprising
at least one inductance module (102) having in each case at least one common-mode choke (112) wound around the positive high-voltage pole (108) and the negative high-voltage pole (109);
wherein the at least one common-mode choke (112) of the at least one inductance module (102) is additionally wound around a magnetic core (113) arranged between the positive high-voltage pole (108) and the negative high-voltage pole (109).

15. The interference suppression apparatus (100) as claimed in claim 14, wherein the at least one inductance module (102) comprises an inductance module housing for electromagnetic screening, which houses the at least one common-mode choke (112).

16. The interference suppression apparatus (100) as claimed in claim 15, wherein the at least one inductance module housings can be connected to another at least one inductance module housing by screwing and/or clamping and/or plugging in and/or welding.

17. An electronic subassembly (700; 800), having a positive high-voltage pole (108) and a negative high-voltage pole (109), and at least one interference suppression apparatus (100), the interference suppression apparatus (100) comprising
at least one capacitance module (101; 101', 101"), with in each case
at least one first capacitor (103) via which the positive high-voltage pole (108) is connected to ground,
at least one second capacitor (104) via which the negative high-voltage pole (109) is connected to ground, and
at least one third capacitor (107) which is connected between the positive high-voltage pole (108) and the negative high-voltage pole (109);
wherein the electronic subassembly comprises a housing (402); and wherein the positive high-voltage pole (108)

is connected to ground via the at least one first capacitor (103) of the at least one capacitance module (101; 101', 101") via a contact with the housing (402); and wherein the negative high-voltage pole (109) is connected to ground via the at least one second capacitor (104) of the at least one capacitance module (101; 101', 101") via a contact with the housing (402).

* * * * *